United States Patent [19]

Saito et al.

[11] Patent Number: 5,481,525
[45] Date of Patent: Jan. 2, 1996

[54] PULSE TRAIN CONDITION/HEAT SHUT OFF CONDITION DETERMINATION METHOD AND APPARATUS FOR OPTICAL RECORDING, AND OPTICAL RECORDING METHOD AND APPARATUS

[75] Inventors: Jun Saito, Tokyo; Shinichi Kurita, Yokohama, Japan

[73] Assignee: Nikon Corporation, Tokyo, Japan

[21] Appl. No.: 137,984

[22] Filed: Oct. 19, 1993

[30] Foreign Application Priority Data

| Oct. 21, 1992 | [JP] | Japan | 4-282105 |
| Oct. 21, 1992 | [JP] | Japan | 4-282106 |
| Sep. 20, 1993 | [JP] | Japan | 5-232634 |

[51] Int. Cl.$^6$ ............................................. G11B 7/125
[52] U.S. Cl. ..................... 369/116; 369/44.39; 369/100; 369/126; 369/284
[58] Field of Search .......................... 369/116, 284, 369/44.39, 100, 126; 358/296; 346/108

[56] References Cited

U.S. PATENT DOCUMENTS

| 4,438,443 | 3/1984 | Doev et al. ........................ 346/153.1 |
| 4,722,522 | 9/1988 | Van Tongeren et al. ............ 358/296 |
| 4,852,077 | 7/1989 | Clark et al. ....................... 369/284 |
| 4,916,465 | 4/1990 | Van Tongeren et al. ............ 346/108 |
| 5,321,682 | 6/1994 | Spruit et al. ...................... 369/116 |

OTHER PUBLICATIONS

Standard ECMA/TC31/92/36, European Computer Manufacturers Association, 3rd Draft Proposal, Sep. 1992, "Information Interchange on Second Generation 130 mm Optical Disk Cartridges, Rewritable and Worm, Using the Magneto–Optical Effect, and Read Only" (two pages).

*Primary Examiner*—Viet Q. Nguyen
*Attorney, Agent, or Firm*—Shapiro and Shapiro

[57] ABSTRACT

This invention relates to an optical recording method and apparatus, in which the intensity of a laser beam to be radiated onto an optical recording medium is raised from an intensity $P_{pre}$ for maintaining a pre-heat state in which the temperature of the medium surface becomes a predetermined temperature, to $P_{W1}$ higher than $P_{pre}$, the intensity is reduced to an intensity $P_{LT}$ lower than $P_{W1}$ after $P_{W1}$ is maintained for a time $T_{W1}$, and thereafter, the laser beam is intensity-modulated between $P_{LT}$ and an intensity $P_{W2}$ higher than $P_{LT}$ so as to form a mark on the optical recording medium. When at least one of $P_{W2}$, $P_{LT}$, and a time $T_{W2}$ for maintaining $P_{W2}$ is controlled, the medium temperature, after an elapse of $T_{W1}$, at the peak temperature position or the spot center position of the laser beam radiated onto the medium surface is equal to the medium temperature after an elapse of $T_{W2}$.

4 Claims, 12 Drawing Sheets

PULSE TRAIN CONDITION/HEAT SHUT OFF CONDITION DETERMINATION METHOD AND APPARATUS FOR OPTICAL RECORDING, AND OPTICAL RECORDING METHOD AND APPARATUS

BACKGROUND OF THE INVENTION

1. Field of the Invention

The present invention relates to a pulse train condition/ heat shut off condition determination method and apparatus for optical recording, and an optical recording method and apparatus.

b 2. Related Background Art

At present, optical recording is achieved by exclusively utilizing a thermal nature of a laser beam, and recording media (optical disks) include (1) a write-once type optical disk (pit formation type) allowing recording only once, such as an optical disk having a thin metallic film or thermet film as a recording layer, and (2) an optical disk which allows repeated recording, reproduction, and erasure, such as a magnetooptical disk having a magnetic thin film as a recording layer, a phase-change optical disk having a metallic film or thermet film as a recording layer, which film causes a phase change between crystal and amorphous phases, and the like.

Several ten thousands of tracks on which information is to be recorded are spirally or concentrically formed on an optical disk. Two types of information units corresponding to "0" and "1" are formed on each track, thereby recording information. In practice, the track itself (i.e., a background portion) indicates a first information unit corresponding to one of "0" and "1", and second information units (called marks, recently) corresponding to the other one of "0" and "1" are formed on the track in a point or island pattern. In this case, the presence/absence of marks, the mark interval, the mark length, the mark formation start position (i.e., the leading edge position of a mark), the mark formation end position (i.e., the trailing edge position of a mark), and the like express information. In particular, a method of expressing information by the edge position of a mark is called mark length recording.

An optical recording apparatus is mainly constituted by a laser source, a radiation optical system for radiating a laser beam emitted from the laser source onto an optical disk, modulation means for modulating the laser beam intensity according to information to be recorded, and optical disk rotation means. In a magnetooptical recording apparatus, magnetic means for applying a bias magnetic field to the radiation position of the beam is added.

Since optical recording exclusively utilizes a thermal nature of a laser beam (heat mode), the laser beam intensity need only be pulse-modulated between a relatively high first level and a relatively low base level (second level) in principle. When the laser beam intensity is at the first level, a mark is formed; when it is at the second level, no mark is formed. That is, one mark is formed in correspondence with one pulse. The second level can be zero since it does not form any mark. However, when a mark is to be formed, in other words, when the leading edge of a mark is to be formed, it is preferable that the disk temperature state immediately before formation be always positively maintained in a constant temperature state. Otherwise, the leading edge position varies depending on the temperature state immediately before formation. Such a variation disturbs high-density recording. Thus, it is preferable that an optical disk be pre-heated to a predetermined temperature $\Theta_{pre}$, i.e., be set in a pre-heat state, and the second level be normally set at an intensity $P_{pre}$ for maintaining this pre-heat state (temperature $\Theta_{pre}$). The temperature $\Theta_{pre}$ allows the disk temperature immediately before mark formation to be constant independently of the peak temperature position of the beam or the data pattern recorded at the spot center position, and $P_{pre}$ is given by the following formula:

$$\Theta_{pre} = A \times P_{pre} \times \{1 - \exp(-\infty/\tau)\} + \Theta A \qquad \text{formula (3)}$$

where A (°C./mW) is the heat efficiency of the laser beam intensity determined by the disk, the spot, and the recording line density, and $\Theta A$ (°C.) is the disk temperature in a non-radiation state of the beam.

The first mark formation is a method of forming one mark in correspondence with one pulse. FIG. 11 is a waveform chart of the laser beam intensity when one mark is formed by the first method. As shown in FIG. 11, a pulse waveform for raising the laser beam intensity from the base level (second level) $P_{pre}$, to start mark formation, and after the raised intensity (first level) $P_{W1}$ is maintained for a time $T_{W1}$ by a half-width, reducing the intensity to $P_{pre}$ is used. In this case, when the mark length is large, an adverse effect due to heat accumulation appears. The adverse effect is that even when the laser beam intensity is reduced to $P_{pre}$ to end mark formation, the medium temperature cannot be easily decreased to the mark formation start temperature or less due to the heat accumulation so far. For this reason, the mark length or width becomes unexpectedly large. This adverse effect is called "recording data pattern dependency of the mark formation end position, i.e., the mark trailing edge position". This dependency disturbs high-density recording, and decreases identifiability of data.

The second mark formation method can solve this problem to some extent. FIG. 12 is a waveform chart of the laser beam intensity when one mark is formed by the second method. As shown in FIG. 12, the intensity of the laser beam to be radiated onto the optical recording medium is raised from $P_{pre}$ to an intensity $P_{W1}$ higher than $P_{pre}$, and after $P_{W1}$ is maintained for a time $T_{W1}$, the intensity is reduced to an intensity $P_{LT}$ lower than $P_{W1}$. Thereafter, the intensity is modulated between $P_{LT}$ and an intensity $P_{W2}$ higher than $P_{LT}$. The time for maintaining $P_{W2}$ is $T_{W2}$, and the modulation period upon intensity modulation between $P_{LT}$ and $P_{W2}$ is $T_p$. This method is called a pulse train method since a waveform (see FIG. 11) which originally consists of one pulse consists of a start small pulse, and one or two or more following small pulses. In this case, the temperature at the laser beam radiation position on the optical disk during mark formation normally drifts up and down near a high temperature.

In the pulse train method, the respective values are called a pulse train condition. Conventionally, this condition is fixed for any type of optical disks. As described in STANDARD ECMA/TC31/92/36 3rd Draft Proposal, p. 87, European Computer Manufacturers Association (to be referred to as ECMA hereinafter) (see FIG. 13), for example, $P_{LT}$ is equal to an intensity $P_{pre}$ for maintaining a pre-heat state (temperature $\Theta_{pre}$), and $T_{W2}$ is determined to be half of a write clock period T. $P_{W2}$ is determined as a value for minimizing "recording data pattern dependency of the mark trailing edge position" by recording a random pattern using optimal $P_{W1}$ and $P_{pre}$ which are determined in advance.

In the prior art with the fixed pulse train condition, when $P_{W2}$ is set as a value for minimizing "recording data pattern dependency of the mark trailing edge position", the value $P_{W2}$ becomes very large depending on an optical disk to be used. For this reason, a laser source is excessively loaded, thus considerably contributing to early degradation of the laser source.

SUMMARY OF THE INVENTION

It is an object of the present invention to solve the conventional problems.

According to the extensive studies of the present inventors, it was found that the above-mentioned problems are caused by the fixed pulse train condition for any type of optical disks, and an optimal pulse train condition is not applied to some optical disks. As a result of further extensive studies, the present inventors found that a thermal time constant τ varies in units of optical disks, and invented a method and apparatus for determining an optimal pulse train condition in consideration of τ. Also, the present inventors invented a method and apparatus for executing optical recording using the determined pulse train condition.

In the case of high-density recording, the start position of the next mark undesirably varies depending on the end position of the immediately preceding mark. This phenomenon is called "recording data pattern dependency of the mark formation start position, i.e., the mark leading edge position". In order to solve this problem, an optical recording method for, when the laser beam intensity is reduced to end mark formation, temporarily reducing the intensity to $P_{LB}$ lower than $P_{pre}$, and after an elapse of a time $T_{off}$, raising the intensity to $P_{pre}$ has been proposed. FIGS. 9 and 10 are waveform charts of the laser beam intensity when one mark is formed by this method. FIG. 9 shows a case wherein one mark is formed in correspondence with one pulse, and FIG. 10 shows a case wherein a mark is formed by the pulse train method. In this method, formation of the next mark is started from a predetermined position regardless of the length of the immediately preceding mark. In this manner, a thermal influence from the immediately preceding mark is shut off for the next mark. A condition for shutting off the thermal influence in this manner is called a "heat shut off condition", and is expressed by $P_{pre}$, $P_{LB}$, and $T_{off}$.

When the laser beam intensity decreases from $P_{W1}$ or $P_{W2}$, and reaches $P_{pre}$ via $P_{LB}$, the temperature of an optical disk decreases from a high temperature (to be referred to as $\Theta_{top}$ hereinafter) capable of performing mark formation, and then becomes constant at the temperature $\Theta_{pre}$ in the pre-heat state. In this case, there are two types of decreased temperature profiles.

In the first decreased temperature profile, the temperature monotonously decreases from $\Theta_{top}$ to $\Theta_{pre}$, and becomes constant. In the second decreased temperature profile, the temperature decreases from $\Theta_{top}$ to a temperature below $\Theta_{pre}$ temporarily, then increases from the temperature below $\Theta_{pre}$ to $\Theta_{pre}$, and then becomes constant. In either profile, the start position of the next mark formation, i.e., the leading edge position of the next mark cannot be formed at a desired position unless the temperature of the optical disk is constant at $\Theta_{pre}$. In either profile, a time from when the temperature decreases from $\Theta_{top}$ until it becomes constant at $\Theta_{pre}$ will be referred to as $T_{tc}$ hereinafter.

When the next mark is formed before an elapse of the time $T_{tc}$ so as to increase the recording density, the leading edge position of the next mark undesirably has recording data pattern dependency, and data identifiability decreases. Thus, after an elapse of the time $T_{tc}$, the next mark is formed. In this case, if the time $T_{tc}$ is long, the interval to the next mark increases, and the recording density becomes low.

A condition for shortening $T_{tc}$ can be considered as a heat shut off condition. FIG. 14 is a graph showing a change in temperature of the spot center of the laser beam or a change in peak temperature as time elapses when a mark is formed by the pulse train method and the heat shut off method. Under an insufficient heat shut off condition, a decreased temperature profile indicated by a one dash line in FIG. 14 is obtained, resulting in long $T_{tc}$. Under an excessive heat shut off condition, a decreased temperature profile indicated by a two dash line in FIG. 14 is obtained, resulting in long $T_{tc}$ as well. Under an optimal heat shut off condition, a decreased temperature profile indicated by a full line in FIG. 14 is obtained, resulting in a shortest $T_{tc}$. When recording is performed by the pulse train method, the disk temperature state immediately before formation must be positively kept constant at the beginning of writing of a mark, i.e., upon formation of the leading edge of a mark. As a method of realizing this, the above-mentioned heat shut off method is very effective. Therefore, the pulse train method is preferably used in combination with the heat shut off method.

Under the heat shut off condition with $P_{LB}=0$ in formula (2), $T_{tc}$ shown in FIG. 14 becomes minimum as an absolute value. Therefore, $P_{LB}$ is preferably set to be zero. Also, $T_{off}$ is preferably set to be equal to or close to a value m/n times (m and n are natural numbers) of a write clock period T.

More specifically, according to the first aspect of the invention, there is provided an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, and thereafter, the laser beam is intensity-modulated between $P_{LT}$ and an intensity $P_{W2}$ higher than $P_{LT}$ so as to form a mark on the optical recording medium, wherein, by controlling at least one of $P_{W2}$, $P_{LT}$, and a time $T_{W2}$ for maintaining $P_{W2}$, the medium temperature, after an elapse of $T_{W1}$, at a peak temperature position or a spot center position of the laser beam radiated onto the medium surface becomes equal to the medium temperature after an elapse of $T_{W2}$.

According to the second aspect of the invention, there is provided an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, and thereafter, the laser beam is intensity-modulated between $P_{LT}$ and an intensity $P_{W2}$ higher than $P_{LT}$ so as to form a mark on the optical recording medium, wherein the respective values are determined as a combination for satisfying the following formula (1).

$$(P_{W1} - P_{pre}) \times \{1 - \exp(-T_{W1}/\tau)\} \times \{1 - \exp(-T_p/\tau)\} = (P_{LT} - P_{pre}) \times \{1 - \exp(-T_p/\tau)\} + \quad \text{formula (1)}$$

-continued $$(P_{W2} - P_{LT}) \times \{1 - \exp(-T_{W2}/\tau)\}$$

where $\tau$ is the thermal time constant of the optical recording medium, $T_{W2}$ is the time for maintaining $P_{W2}$, and $T_p$ is the modulation period upon intensity-modulation of the laser beam between $P_{LT}$ and $P_{W2}$.

According to the third aspect of the invention, there is provided an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, thereafter, the laser beam is intensity-modulated between $P_{LT}$ and an intensity $P_{W2}$ higher than $P_{LT}$ so as to form a mark on the optical recording medium, thereafter, the intensity is reduced to an intensity $P_{LB}$ lower than $P_{pre}$, and after an elapse of a time $T_{off}$, the intensity is raised to $P_{pre}$, wherein, by controlling at least one of $P_{W2}$, $P_{LT}$, and a time $T_{W2}$ for maintaining $P_{W2}$, the medium temperature, after an elapse of $T_{W1}$, at a peak temperature position or a spot center position of the laser beam radiated onto the medium surface becomes equal to the medium temperature after an elapse of $T_{W2}$, and by controlling at least one of $P_{pre}$, $T_{off}$, and $P_{LB}$, the pre-heat state is established within a time period until the intensity is raised to $P_{W1}$ again to form the next mark.

According to the fourth aspect of the invention, there is provided an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, thereafter, the laser beam is intensity-modulated between $P_{LT}$ and an intensity $P_{W2}$ higher than $P_{LT}$ so as to form a mark on the optical recording medium, thereafter, the intensity is reduced to an intensity $P_{LB}$ lower than $P_{pre}$, and after an elapse of a time $T_{off}$, the intensity is raised to $P_{pre}$, wherein the respective values are determined as a combination for satisfying formula (1) and the following formula (2):

$$T_{off} = \tau \times \ln\left[\{(P_{W1} - P_{LB}) - (P_{W1} - P_{pre}) \times \exp(-T_{W1}/\tau)\} \div (P_{pre} - P_{LB})\right] \quad \text{formula (2)}$$

where $\tau$ is the thermal time constant of the optical recording medium.

According to the fifth aspect of the invention, thermal response characteristics of the optical recording medium are approximated by an exponential function in the optical recording method according to any one of the first to third aspects of the invention.

According to the sixth aspect of the invention, the intensity $P_{LT}$ is set to be equal to the intensity $P_{pre}$ in the optical recording method according to any one of the first to fourth aspects of the invention.

According to the seventh aspect of the invention, the intensity $P_{LT}$ is set to be larger than the intensity $P_{pre}$ in the optical recording method according to any one of the first to fourth aspects of the invention.

According to the eighth aspect of the invention, the modulation period $T_p$ upon intensity-modulation of the laser beam between $P_{LT}$ and the intensity $P_{W2}$ higher than $P_{LT}$ is set to be equal to the write clock period T in the optical recording method according to any one of the first to fourth aspects of the invention.

According to the ninth aspect of the invention, the time $T_{W2}$ for maintaining $P_{W2}$ is set to be m/n times (m and n are natural numbers; m<n) of the modulation period $T_p$ upon intensity-modulation of the laser beam between $P_{LT}$ and $P_{W2}$ higher than $P_{LT}$ in the optical recording method according to any one of the first to fourth aspects of the invention.

According to the 10th aspect of the invention, the intensity $P_{W2}$ is set to be equal to the intensity $P_{W1}$ in the optical recording method according to any one of the first to fourth aspects of the invention.

According to the 11th aspect of the invention, the intensity $P_{W2}$ is set to be smaller than the intensity $P_{W1}$ in the optical recording method according to any one of the first to fourth aspects of the invention.

According to the 12th aspect of the invention, the intensity $P_{LB}$ is set to be zero in the optical recording method according to the third or fourth aspect of the invention.

According to the 13th aspect of the invention, the time $T_{off}$ is set to be equal to or close to a value m/n times (m and n are natural numbers) of the write clock period T in the optical recording method according to the third or fourth aspect of the invention.

According to the 14th aspect of the invention, there is provided an optical recording apparatus comprising: a laser source for emitting a laser beam; radiation means for radiating the laser beam onto an optical recording medium; moving means for changing a radiation position of the laser beam on the recording medium; modulation means for raising an intensity of the laser beam to be radiated onto the optical recording medium from an intensity $P_{pre}$ for maintaining a pre-heat state, in which a temperature of the medium surface becomes a predetermined temperature, to an intensity $P_{W1}$ higher than $P_{pre}$, reducing the intensity to an intensity $P_{LT}$ lower than $P_{W1}$ after $P_{W1}$ is maintained for a time $T_{W1}$, and thereafter, intensity-modulating the laser beam between $P_{LT}$ and an intensity $P_{W2}$ higher than $P_{LT}$ so as to form a mark; and control means for controlling at least one of $P_{W2}$, $P_{LT}$, and a time $T_{W2}$ for maintaining $P_{W2}$, so that the medium temperature, after an elapse of $T_{W1}$, at a peak temperature position or a spot center position of the laser beam radiated onto the medium surface becomes equal to the medium temperature after an elapse of the time $T_{W2}$.

According to the 15th aspect of the invention, there is provided an optical recording apparatus comprising: a laser source for emitting a laser beam; radiation means for radiating the laser beam onto an optical recording medium; moving means for changing a radiation position of the laser beam on the recording medium; modulation means for raising an intensity of the laser beam to be radiated onto the optical recording medium from an intensity $P_{pre}$ for maintaining a pre-heat state, in which a temperature of the medium surface becomes a predetermined temperature, to an intensity $P_{W1}$ higher than $P_{pre}$, reducing the intensity to an intensity $P_{LT}$ lower than $P_{W1}$ after $P_{W1}$ is maintained for a time $T_{W1}$, and thereafter, intensity-modulating the laser beam between $P_{LT}$ and an intensity $P_{W2}$ higher than $P_{LT}$ so as to form a mark; and condition determination means for determining the respective values as a combination for satisfying formula (1).

According to the 16th aspect of the invention, there is provided an optical recording apparatus comprising: a laser source for emitting a laser beam; radiation means for radiating the laser beam onto an optical recording medium; moving means for changing a radiation position of the laser beam on the recording medium; first modulation means for raising an intensity of the laser beam to be radiated onto the optical recording medium from an intensity $P_{pre}$ for maintaining a pre-heat state, in which a temperature of the medium surface becomes a predetermined temperature, to an intensity $P_{W1}$ higher than $P_{pre}$, reducing the intensity to an intensity $P_{LT}$ lower than $P_{W1}$ after $P_{W1}$ is maintained for a time $T_{W1}$, and thereafter, intensity-modulating the laser beam between $P_{LT}$ and an intensity $P_{W2}$ higher than $P_{LT}$ so as to form a mark; second modulation means for reducing the intensity to the intensity $P_{LB}$ lower than $P_{pre}$ after the mark is formed on the optical recording medium, and raising the intensity to $P_{pre}$ after an elapse of a time $T_{off}$; first control means for controlling at least one of $P_{W2}$, $P_{LT}$, and a time $T_{W2}$ for maintaining $P_{W2}$, so that the medium temperature, after an elapse of $T_{W1}$, at a peak temperature position or a spot center position of the laser beam radiated onto the medium surface becomes equal to the medium temperature after an elapse of the time $T_{W2}$; and second control means for controlling at least one of $P_{pre}$, $T_{off}$, and $P_{LB}$, so that the pre-heat state is established within a time period until the intensity is raised to $P_{W1}$ again to form the next mark.

According to the 17th aspect of the invention, there is provided an optical recording apparatus comprising: a laser source for emitting a laser beam; radiation means for radiating the laser beam onto an optical recording medium; moving means for changing a radiation position of the laser beam on the recording medium; first modulation means for raising an intensity of the laser beam to be radiated onto the optical recording medium from an intensity $P_{pre}$ for maintaining a pre-heat state, in which a temperature of the medium surface becomes a predetermined temperature, to an intensity $P_{W1}$ higher than $P_{pre}$, reducing the intensity to an intensity $P_{LT}$ lower than $P_{W1}$ after $P_{W1}$ is maintained for a time $T_{W1}$, and thereafter, intensity-modulating the laser beam between $P_{LT}$ and an intensity $P_{W2}$ higher than $P_{LT}$ so as to form a mark; second modulation means for reducing the intensity to the intensity $P_{LB}$ lower than $P_{pre}$ after the mark is formed on the optical recording medium, and raising the intensity to $P_{pre}$ after an elapse of a time $T_{off}$; and condition determination means for determining the respective values as a combination for satisfying formulas (1) and (2).

According to the 18th aspect of the invention, the intensity $P_{LT}$ is set to be equal to the intensity $P_{pre}$ in the optical recording apparatus according to any one of the 14th to 17th aspects of the invention.

According to the 19th aspect of the invention, the intensity $P_{LT}$ is set to be larger than the intensity $P_{pre}$ in the optical recording apparatus according to any one of the 14th to 17th aspects of the invention.

According to the 20th aspect of the invention, the modulation period $T_p$ upon intensity-modulation of the laser beam between $P_{LT}$ and the intensity $P_{W2}$ higher than $P_{LT}$ is set to be equal to the write clock period T in the optical recording apparatus according to any one of the 14th to 17th aspects of the invention.

According to the 21st aspect of the invention, the time $T_{W2}$ for maintaining $P_{W2}$ is set to be m/n times (m and n are natural numbers; m<n) of the modulation period $T_p$ upon intensity-modulation of the laser beam between $P_{LT}$ and $P_{W2}$ higher than $P_{LT}$ in the optical recording apparatus according to any one of the 14th to 17th aspects of the invention.

According to the 22nd aspect of the invention, the intensity $P_{W2}$ is set to be equal to the intensity $P_{W1}$ in the optical recording apparatus according to any one of the 14th to 17th aspects of the invention.

According to the 23rd aspect of the invention, the intensity $P_{W2}$ is set to be smaller than the intensity $P_{W1}$ in the optical recording apparatus according to any one of the 14th to 17th aspects of the invention.

According to the 24th aspect of the invention, the intensity $P_{LB}$ is set to be zero in the optical recording apparatus according to the 16th or 17th aspect of the invention.

According to the 25th aspect of the invention, the time $T_{off}$ is set to be equal to or close to a value m/n times (m and n are natural numbers) of the write clock period T in the optical recording apparatus according to the 16th or 17th aspect of the invention.

According to the 26th aspect of the invention, there is provided in a method for determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, and thereafter, the laser beam is intensity-modulated between $P_{LT}$ and an intensity $P_{W2}$ higher than $P_{LT}$ so as to form a mark on the optical recording medium, an optical recording pulse train condition determination method wherein a combination of $P_{W2}$, $P_{LT}$, and a time $T_{W2}$ for maintaining $P_{W2}$ is determined, so that the medium temperature, after an elapse of $T_{W1}$, at a peak temperature position or a spot center position of the laser beam radiated onto the medium surface becomes equal to the medium temperature after an elapse of $T_{W2}$, According to the 27th aspect of the invention, there is provided in a method for determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, and thereafter, the laser beam is intensity-modulated between $P_{LT}$ and an intensity $P_{W2}$ higher than $P_{LT}$ so as to form a mark on the optical recording medium, an optical recording pulse train condition determination method wherein the respective values are determined as a combination for satisfying formula (1).

According to the 28th aspect of the invention, there is provided in a method for determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, thereafter, the laser beam is intensity-modulated between $P_{LT}$ and an intensity $P_{W2}$ higher than $P_{LT}$ so as to form a mark on the optical recording medium, thereafter, the intensity is reduced to an intensity $P_{LB}$ lower than $P_{pre}$, and after an elapse of a time $T_{off}$, the intensity is raised to $P_{pre}$, an optical recording pulse train condition/heat shut off condition determination method wherein a combination of $P_{W2}$, $P_{LT}$, and a time $T_{W2}$ for maintaining $P_{W2}$ is determined, so that the medium temperature, after an elapse of $T_{W1}$, at a peak temperature position or a spot center position of the laser beam radiated onto the medium surface becomes equal to the medium temperature after an elapse of $T_{W2}$, and a combination of $P_{pre}$, $T_{off}$ and $P_{LB}$ is determined, so that the pre-heat state is established within a time period until the intensity is raised to $P_{W1}$ again to form the next mark.

According to the 29th aspect of the invention, there is provided in a method for determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, thereafter, the laser beam is intensity-modulated between $P_{LT}$ and an intensity $P_{W2}$ higher than $P_{LT}$ so as to form a mark on the optical recording medium, thereafter, the intensity is reduced to an intensity $P_{LB}$ lower than $P_{pre}$, and after an elapse of a time $T_{off}$, the intensity is raised to $P_{pre}$, an optical recording pulse train condition/heat shut off condition determination method wherein the respective values are determined as a combination for satisfying formulas (1) and (2).

According to the 30th aspect of the invention, the intensity $P_{LT}$ is set to be equal to the intensity $P_{pre}$ in the method according to any one of the 26th to 29th aspects of the invention.

According to the 31st aspect of the invention, the intensity $P_{LT}$ is set to be larger than the intensity $P_{pre}$ in the method according to any one of the 26th to 29th aspects of the invention.

According to the 32nd aspect of the invention, the modulation period $T_p$ upon intensity-modulation of the laser beam between $P_{LT}$ and the intensity $P_{W2}$ higher than $P_{LT}$ is set to be equal to the write clock period T in the method according to any one of the 26th to 29th aspects of the invention.

According to the 33rd aspect of the invention, the time $T_{W2}$ for maintaining $P_{W2}$ is set to be m/n times (m and n are natural numbers; m<n) of the modulation period $T_p$ upon intensity-modulation of the laser beam between $P_{LT}$ and $P_{W2}$ higher than $P_{LT}$ in the method according to any one of the 26th to 29th aspects of the invention.

According to the 34th aspect of the invention, the intensity $P_{W2}$ is set to be equal to the intensity $P_{W1}$ in the method according to any one of the 26th to 29th aspects of the invention.

According to the 35th aspect of the invention, the intensity $P_{W2}$ is set to be smaller than the intensity $P_{W1}$ in the method according to any one of the 26th to 29th aspects of the invention.

According to the 36th aspect of the invention, the intensity $P_{LB}$ is set to be zero in the method according to the 28th or 29th aspect of the invention.

According to the 37th aspect of the invention, the time $T_{off}$ is set to be equal to or close to a value m/n times (m and n are natural numbers) of the write clock period T in the method according to the 28th or 29th aspect of the invention.

According to the 38th aspect of the invention, there is provided in an apparatus for determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, and thereafter, the laser beam is intensity-modulated between $P_{LT}$ and an intensity $P_{W2}$ higher than $P_{LT}$ so as to form a mark on the optical recording medium, an optical recording pulse train condition determination apparatus comprising: a calculation unit for calculating a combination of $P_{W2}$, $P_{LT}$, and a time $T_{W2}$ for maintaining $P_{W2}$, so that the medium temperature, after an elapse of $T_{W1}$, at a peak temperature position or a spot center position of the laser beam radiated onto the medium surface becomes equal to the medium temperature after an elapse of $T_{W2}$; and an output unit for outputting values calculated by the calculation unit.

According to the 39th aspect of the invention, there is provided in an apparatus for determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, and thereafter, the laser beam is intensity-modulated between $P_{LT}$ and an intensity $P_{W2}$ higher than $P_{LT}$ so as to form a mark on the optical recording medium, an optical recording pulse train condition determination apparatus comprising: a calculation unit for calculating the respective values as a combination for satisfying formula (1); and an output unit for outputting the values calculated by the calculation unit.

According to the 40th aspect of the invention, there is provided in an apparatus for determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, thereafter, the laser beam is intensity-modulated between $P_{LT}$ and an intensity $P_{W2}$ higher than $P_{LT}$ so as to form a mark on the optical recording medium, thereafter, the intensity is reduced to an intensity $P_{LB}$ lower than $P_{pre}$, and after an elapse of a time $T_{off}$, the intensity is raised to $P_{pre}$, an optical recording pulse train condition/heat shut off condition determination apparatus comprising: a first calculation unit for calculating a combination of $P_{W2}$, $P_{LT}$, and a time $T_{W2}$ for maintaining $P_{W2}$, so that the medium temperature, after an elapse of $T_{W1}$, at a peak temperature position or a spot center position of the laser beam radiated onto the medium surface becomes equal to the medium temperature after an elapse of $T_{W2}$; a second calculation unit for calculating a combination of $P_{pre}$, $T_{off}$, and $P_{LB}$, so that the pre-heat state is attained within a time period until the intensity is raised to $P_{W1}$ again so as to form the next mark; and an output unit for outputting the values calculated by the calculation units.

According to the 41st aspect of the invention, there is provided in an apparatus for determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, thereafter, the laser beam is intensity-modulated between $P_{LT}$ and an intensity $P_{W2}$ higher than $P_{LT}$ so as to form a mark on the optical recording medium, thereafter, the intensity is reduced to an intensity $P_{LB}$ lower than $P_{pre}$, and after an elapse of a time $T_{off}$, the intensity is raised to $P_{pre}$, an optical recording pulse train condition/heat shut off condition determination apparatus comprising: a calculation unit for calculating the respective values as a combination for satisfying formulas (1) and (2); and an output unit for outputting the values calculated by the calculation unit.

According to the 42nd aspect of the invention, the intensity $P_{LT}$ is set to be equal to the intensity $P_{pre}$ in the apparatus according to any one of the 38th to 41st aspects of the invention.

According to the 43rd aspect of the invention, the intensity $P_{LT}$ is set to be larger than the intensity $P_{pre}$ in the apparatus according to any one of the 38th to 41st aspects of the invention.

According to the 44th aspect of the invention, the modulation period $T_p$ upon intensity-modulation of the laser beam between $P_{LT}$ and the intensity $P_{W2}$ higher than $P_{LT}$ is set to be equal to the write clock period T in the apparatus according to any one of the 38th to 41st aspects of the invention.

According to the 45th aspect of the invention, the time $T_{W2}$ for maintaining $P_{W2}$ is set to be m/n times (m and n are natural numbers; m<n) of the modulation period $T_p$ upon intensity-modulation of the laser beam between $P_{LT}$ and $P_{W2}$ higher than $P_{LT}$ in the apparatus according to any one of the 38th to 41st aspects of the invention.

According to the 46th aspect of the invention, the intensity $P_{W2}$ is set to be equal to the intensity $P_{W1}$ in the apparatus according to any one of the 38th to 41st aspects of the invention.

According to the 47th aspect of the invention, the intensity $P_{W2}$ is set to be smaller than the intensity $P_{W1}$ in the apparatus according to any one of the 38th to 41st aspects of the invention.

According to the 48th aspect of the invention, the intensity $P_{LB}$ is set to be zero in the apparatus according to the 40th or 41st aspect of the invention.

According to the 49th aspect of the invention, the time $T_{off}$ is set to be equal to or close to a value m/n times (m and n are natural numbers) of the write clock period T in the apparatus according to the 40th or 41st aspect of the invention.

The general principle of the above-described methods and apparatuses will be described hereinafter.

The thermal time constant τ will be explained below.

FIG. 3 includes an example (a) of a pattern (waveform) of a data signal to be recorded, a chart (a chart of electric power to be input to a laser source) (b) showing a light-emission intensity $P_1$ and a light-off intensity P0 of the laser beam at that time, a temperature profile (elevated temperature profile) (c) of the disk at that time, and an explanatory view (d) showing the relationship of marks to be formed.

When optical recording is performed on an optical disk using a recording laser beam (pulse), optical disks are classified into two types, i.e., heat-insulation disks and heat-diffusion disks in terms of heat diffusion. Assume that a laser beam is raised from the light-off intensity to the light-emission intensity in a step-function pattern (like a rectangular wave), as shown in (b) in FIG. 3, in accordance with a data signal ((a) in FIG. 3). Since the heat-insulation disk tends to accumulate heat as compared to the heat-diffusion disk, a temperature elevation [°C./mW] per unit intensity of the laser beam, i.e., A in formula (3) is large. More specifically, when the laser beam is radiated at the same intensity for a long period of time, the temperature saturation level of the heat-insulation disk is higher than that of the heat-diffusion disk.

On the other hand, the heat-insulation disk requires a longer time until the instantaneous (elevated) temperature profile or temperature profile is saturated than that of the heat-diffusion disk. FIG. 4 is a graph showing the temperature profile showing a time ($t_{sat}$) required until the temperature is saturated. More specifically, the heat-insulation disk has longer $t_{sat}$ in FIG. 4 than that of the heat-diffusion disk. This can be easily understood from the fact that an earthen teapot is harder to warm up and to cool down than an iron kettle is. The thermal time constant τ corresponds to $t_{sat}$. More specifically, a disk having long $t_{sat}$ has large τ.

One of the present inventors made extensive studies, and invented a method of measuring the thermal time constant of a disk by measuring an optical disk itself in advance. This measurement method will be explained below.

Thermal Time Constant Measurement Method

An optical disk to be measured, and an optical recording/reproduction apparatus for evaluating an optical disk (to be also referred to as an evaluation drive hereinafter) are prepared. A laser beam has N.A.= 0.55, and a wavelength= 830 nm, and both the rising and falling times of the laser beam are about 5 nsec. The optical disk is set on the evaluation drive, and is rotated so that the track of the disk has a measurement linear velocity (V=11.3 m/sec). The laser beam spot of the evaluation drive is radiated on the track under the servo control. More specifically, focusing and tracking servo devices are operated. Then, the laser beam is pulse-modulated. Upon radiation of the laser beam, the disk temperature is elevated. In this case, pulse modulation is performed to have a duty cycle, which can assure a time interval long enough not to cause interference of heat generated by heating of pulses. Pulses having various pulse duration times (to be abbreviated as P.D.T. hereinafter) are radiated onto the disk, and a "minimum power ($P_{th}$) capable of performing recording on the disk" of each P.D.T. is obtained.

FIG. 5 is a waveform chart for explaining the P.D.T. FIG. 5 shows that a laser beam pulse is radiated on the disk with the "minimum power ($P_{th}$) capable of performing recording on the disk". FIG. 6 is a graph wherein data are plotted while the ordinate represents $P_{th}$, and the abscissa represents P.D.T. As shown in FIG. 6, $P_{th}$ decreases as P.D.T. is prolonged, and converges to a predetermined level $P_0$ after P.D.T reaches a certain value.

Then, as shown in FIG. 7, data are plotted while the ordinate represents a reciprocal number of a value obtained by normalizing $P_{th}$ with $P_0$, i.e., $P_0/P_{th}$, and the abscissa represents P.D.T. This graph represents a thermal response function in an elevated temperature state obtained when the laser beam is radiated onto the disk. Also, as shown in FIG. 8, when the ordinate represents $1-P_0/P_{th}$, the graph represents a thermal response function in a decreased temperature state obtained when the laser beam is turned off. When the thermal response function shown in FIG. 8 can be approximated to an exponential function exp(−t/τ), τ represents the thermal time constant of the temperature elevation/decrease by the measured laser beam, of the measured optical disk at the measured linear velocity (V).

Under the conventional fixed pulse train condition, it is difficult to minimize "recording data pattern dependency of the mark trailing edge position". Also, the value $P_{W2}$ undesirably becomes very large depending on optical disks to be used. However, when the pulse train condition obtained by substituting τ in formula (1) according to the present invention is used, the dependency can be minimized, and the value $P_{W2}$ for minimizing the dependency can be decreased. This fact was found for the first time by the present inventors. When the dependency is decreased, high-density recording can be precisely executed, and identifiability of data can be improved.

For the sake of easy manufacture, it is preferable that the modulation period $T_p$ upon intensity-modulation of the laser beam between $P_{LT}$ and the intensity $P_{W2}$ higher than $P_{LT}$ is set to be equal to the write clock period T, and the time $T_{W2}$ is set to be m/n times (m and n are natural numbers; m<n) of the modulation period $T_p$. The pulse train condition given by formula (1) can be applied to only a case wherein the thermal response characteristics of a disk can be approximated by a simple exponential function $\exp(-t/\tau)$. When the thermal response characteristics cannot be approximated by a simple exponential function, the thermal response function is assumed as a function f(t) of time, and is considered as follows.

If we let t=0 be time after the intensity level $P_{W1}$ is maintained for the time $T_{W1}$, and is then reduced to $P_{LT}$, and F0 be the temperature of the disk at that time (since the temperature is proportional to the intensity of the laser beam, it will be expressed as a time function of the intensity hereinafter), F0 is given by:

$$F0 = P_{pre} \cdot f(T_{W1}) + P_{W1} \cdot \{1 - f(T_{W1})\}$$

A disk temperature Fn at the end of an n-th following pulse, i.e., after an elapse of a time $t=nT_p$, is given by:

$$Fn = P_{pre} \cdot f(T_{W1} + nT_p) + P_{W1} \{f(nT_p) - f(T_{W1} + nT_p)\} + \sum_{i=1}^{n} [P_{LT} \times [f(T_{W2} + (i-1)T_p) - f(iT_p)] + P_{W2} \cdot [f\{(i-1)T_p\} - f(T_{W2} + (i-1)T_p)]]$$

A condition for making the peak temperature of the disk by the start pulse ($P_{W1}$, $T_{W1}$) to be equal to the peak temperature of the disk by each of n following pulses ($P_{W2}$, $T_{W2}$) is given by F0=F1=F2=...=Fn. More specifically, if Fn=Fn+1 (n=0, 1, 2, ...), formula (4) is established:

$$P_{pre} \cdot [f\{T_{W1} + (n+1)T_p\} - f(T_{W1} + nT_p)] + \quad \text{formula (4)}$$
$$P_{W1} \cdot [f\{(n+1)T_p\} - f\{T_{W1} + (n+1)T_p\} - f(nT_p) + f(T_{W1} + nT_p)] +$$
$$P_{LT} \cdot [f(T_{W2} + nT_p) - f\{(n+1)T_p\}] +$$
$$P_{W2} \cdot \{f(nT_p) - f(T_{W2} + nT_p)\} = 0$$

Formula (4) cannot be solved any more. Thus, assume that f(t) satisfies the following condition:

$$f(a) \cdot f(b) = f(a+b), \quad f(a)/f(b) = f(a-b) \quad \text{formula (5)}$$

Then, formula (5) can be factorized as follows:

$$f(nT_p) [(P_{W1} - P_{pre}) \cdot \{1 - f(T_{W1})\} \cdot \{1 - f(T_p)\} - \quad \text{formula (6)}$$
$$(P_{LT} - P_{pre}) \cdot \{1 - f(T_p)\} - (P_{W2} - P_{LT}) \cdot \{1 - f(T_{W2})\}] = 0$$

Therefore, if $(P_{W1}-P_{pre})\cdot\{1-f(T_{W1})\}\cdot\{1-f(T_p)\}- (P_{LT}-P_{pre})\cdot\{1-f(T_p)\}-(P_{W2}-P_{LT})\cdot\{1-f(T_{W2})\}=0$ in formula (6), a condition for satisfying Fn=Fn+1 for an arbitrary n can be determined. That is, this condition is:

$$(P_{W1} - P_{pre}) \cdot \{1 - f(T_{W1})\} \cdot \{1 - f(T_p)\} = \quad \text{formula (7)}$$
$$(P_{LT} - P_{pre}) \cdot \{1 - f(T_p)\} + (P_{W2} - P_{LT}) \cdot \{1 - f(T_{W2})\}$$

Formula (7) becomes equal to a formula obtained by assuming $\exp(-t/\tau)=f(t)$ in pulse train condition formula (1).

As described above, when the thermal response function f(t) satisfies the condition given by formula (5), the condition for making the peak temperature of the disk by the start pulse ($P_{W1}$, $T_{W1}$) to be equal to the peak temperature of the disk by each of n following pulses ($P_{W2}$, $T_{W2}$) can be determined.

When the thermal response function f(t) does not satisfy the condition given by formula (5), since the condition for making the disk temperature constant cannot be determined, a condition for minimizing an average FA, given by the following formula, of F0 to Fn is searched:

$$\sum_{j=0}^{n} \{(Fj - FA)^2\}$$

The present invention will be described in detail below by way of its examples. However, the present invention is not limited to these examples.

DETAILED DESCRIPTION OF THE PREFERRED EMBODIMENTS

Figure 1:
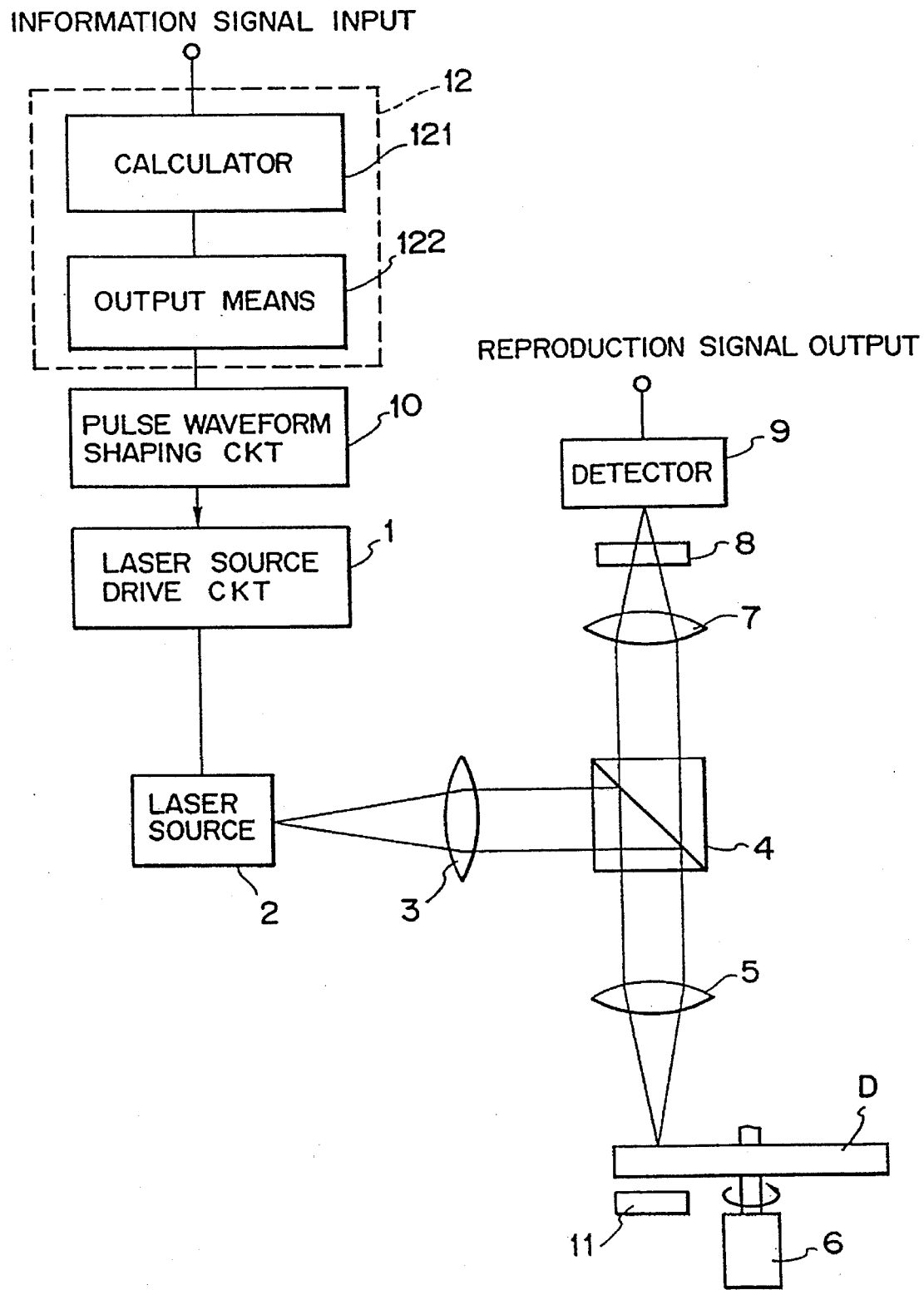
FIG. 1 is a diagram showing an arrangement of main part of a magnetooptical recording apparatus according to an embodiment of the present invention.

FIG. 1 is a diagram showing an arrangement of main part of a magnetooptical recording apparatus according to an embodiment of the present invention. This apparatus also serves as a reproduction apparatus, and mainly comprises a motor (rotation means 6) for rotating a magnetooptical recording medium D, a laser source 2, a laser source drive circuit 1 for pulse-modulating the laser beam intensity between high and low levels in accordance binary data to be recorded, a recording magnetic field applying means (permanent magnet 11), a pulse waveform shaping circuit 10, and a condition determination means 12. The pulse waveform shaping circuit 10 shapes the pulse waveform into a waveform shown in FIG. 2 (to be described later).

The condition determination means 12 comprises a calculation unit 121 for determining a combination of respective values ($P_{pre}$, $P_{W1}$, $P_{W2}$, $P_{LT}$, $P_{LB}$, $T_{W1}$, $T_{W2}$, $T_p$, and $T_{off}$) on the basis of formulas (1) and (2), and an output unit 122 for outputting the determined values. The calculation unit determines the respective values based on formulas (1) and (2). The determined values are output from the output unit. The pulse waveform shaping circuit 10 shapes a pulse waveform on the basis of the output values.

As the medium D, a magnetooptical disk is set. The medium D is rotated by the rotation means 6, so that the linear velocity of tracks on the medium D has a predetermined value. A laser beam spot from the laser source 2 is radiated on a track under the servo control. That is, focusing and tracking servo devices (not shown) are operated. The laser beam emitted from the laser source 2 is pulse-modulated by the laser source drive circuit 1 in accordance with binary data to be recorded. The beam emitted from the laser source 2 is collimated via a collimator lens 3, and is reflected by a beam splitter 4. The reflected beam is focused by an objective lens 5, and forms a focal point on the medium D. Recording is thus basically completed.

In a reproduction mode, a DC-ON laser beam, which is not intensity-modulated, is radiated onto the medium D in the same manner as in a recording mode. Light reflected by the medium is caused to become incident on the beam splitter 4 via the objective lens 5. Light transmitted through the beam splitter 4 is focused by a focusing lens 7, and is caused to become incident on a detector 9. The state of rotation of the plane of polarization is converted into a change in light intensity via an analyzer 8 arranged between the focusing lens 7 and the detector 9. Thus, data recorded on the medium D, which is read as rotation of the plane of polarization, is converted into a change in light intensity. The change in light intensity is converted into electrical signal levels by the detector 9. This is the reproduction process.

Figure 2:
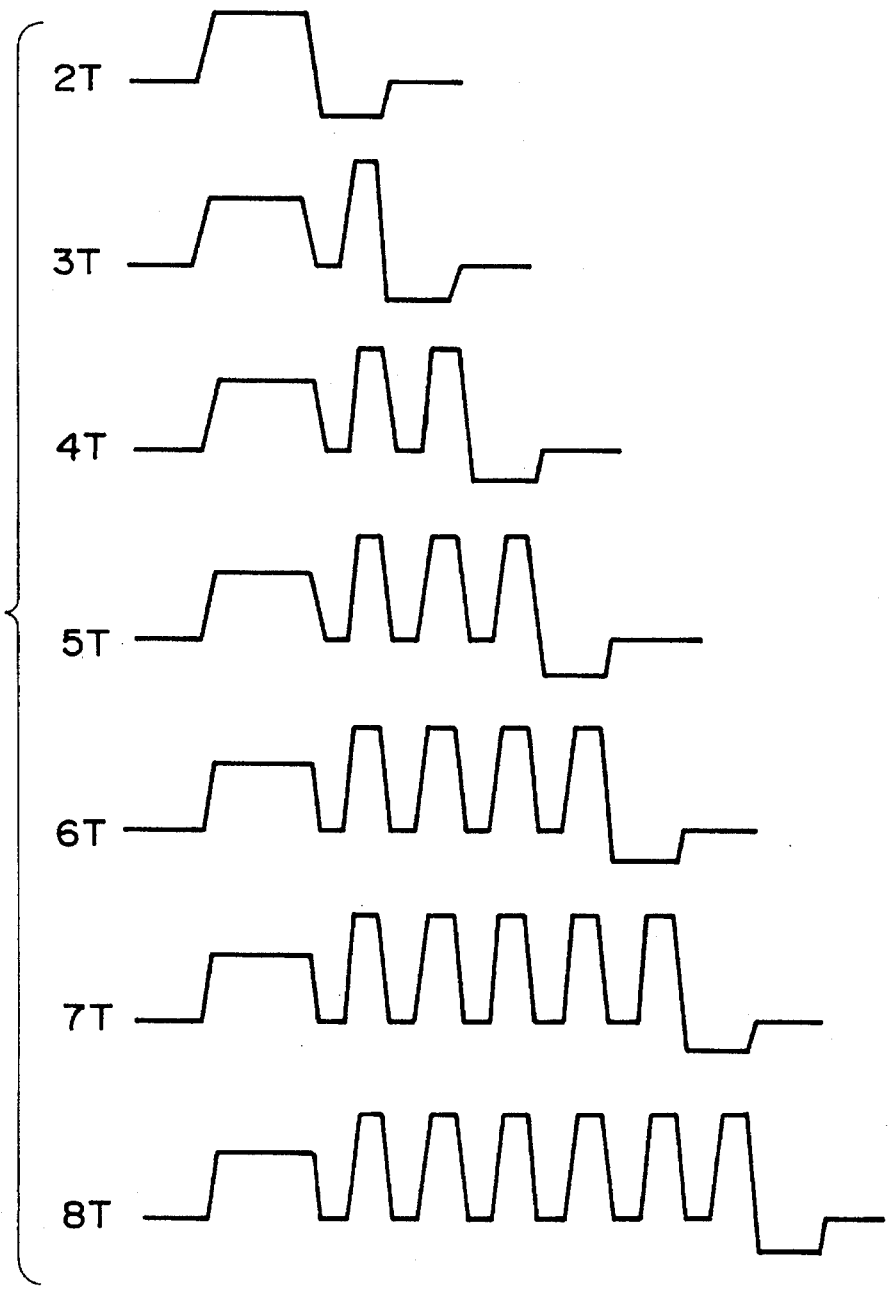
FIG. 2 is a waveform chart of a laser beam intensity when 2T to 8T marks used in the embodiment shown in FIG. 1 are formed.
Figure 3:
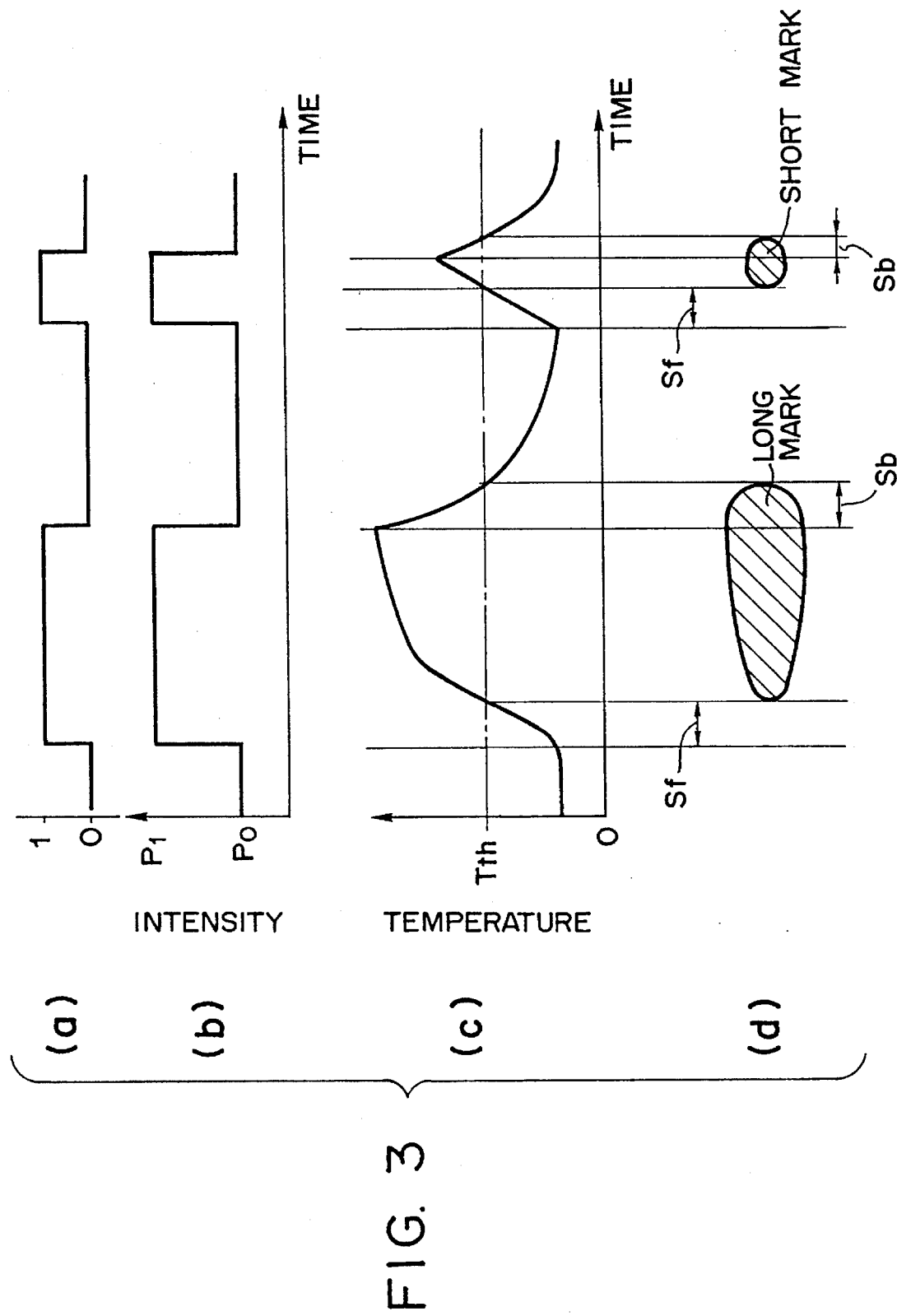
FIG. 3 includes an example of a pattern (waveform) of a data signal to be recorded, a chart (a chart of electric power to be input to a laser source) showing a light-emission intensity $P_1$ and a light-off intensity $P_0$ of the laser beam at that time, a temperature profile (elevated temperature profile) of the disk at that time, and an explanatory view showing the relationship of marks to be formed.
Figure 4:
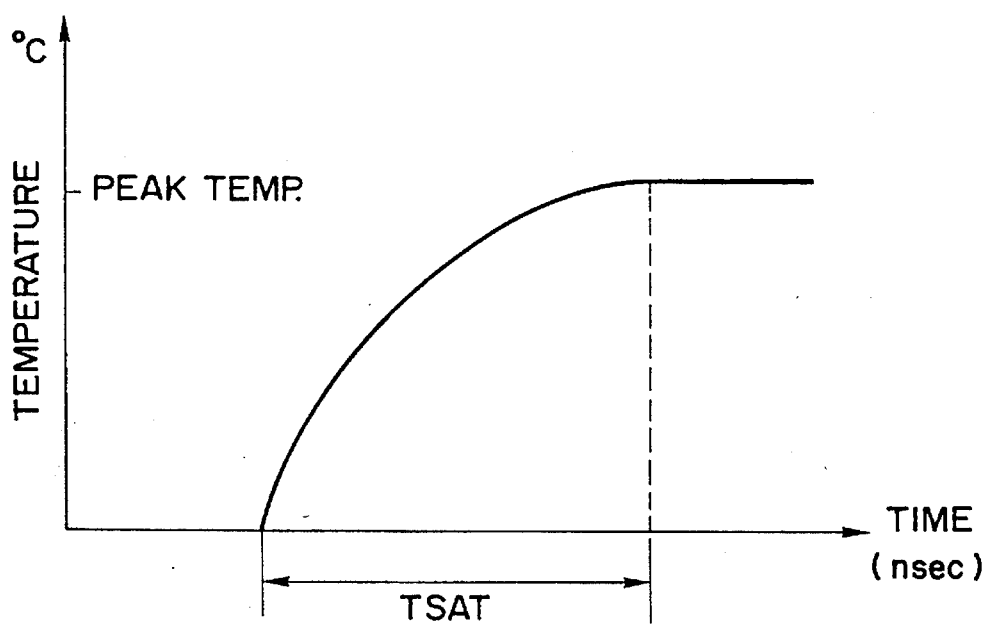
FIG. 4 is a graph of the temperature profile showing a time ($t_{sat}$) required until the temperature is saturated.
Figure 5:
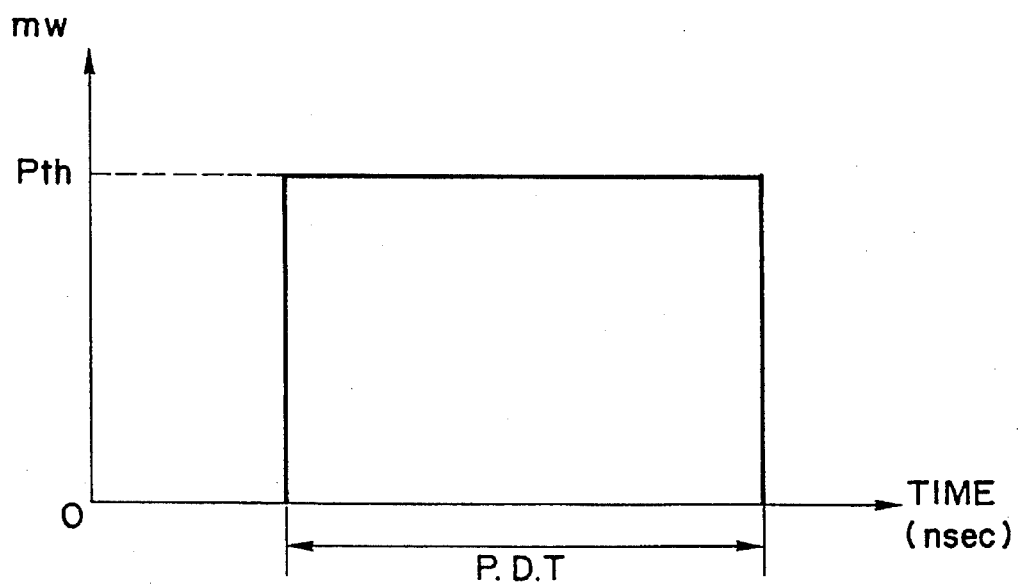
FIG. 5 is a waveform chart for explaining pulse duration time (P.D.T.)
Figure 6:
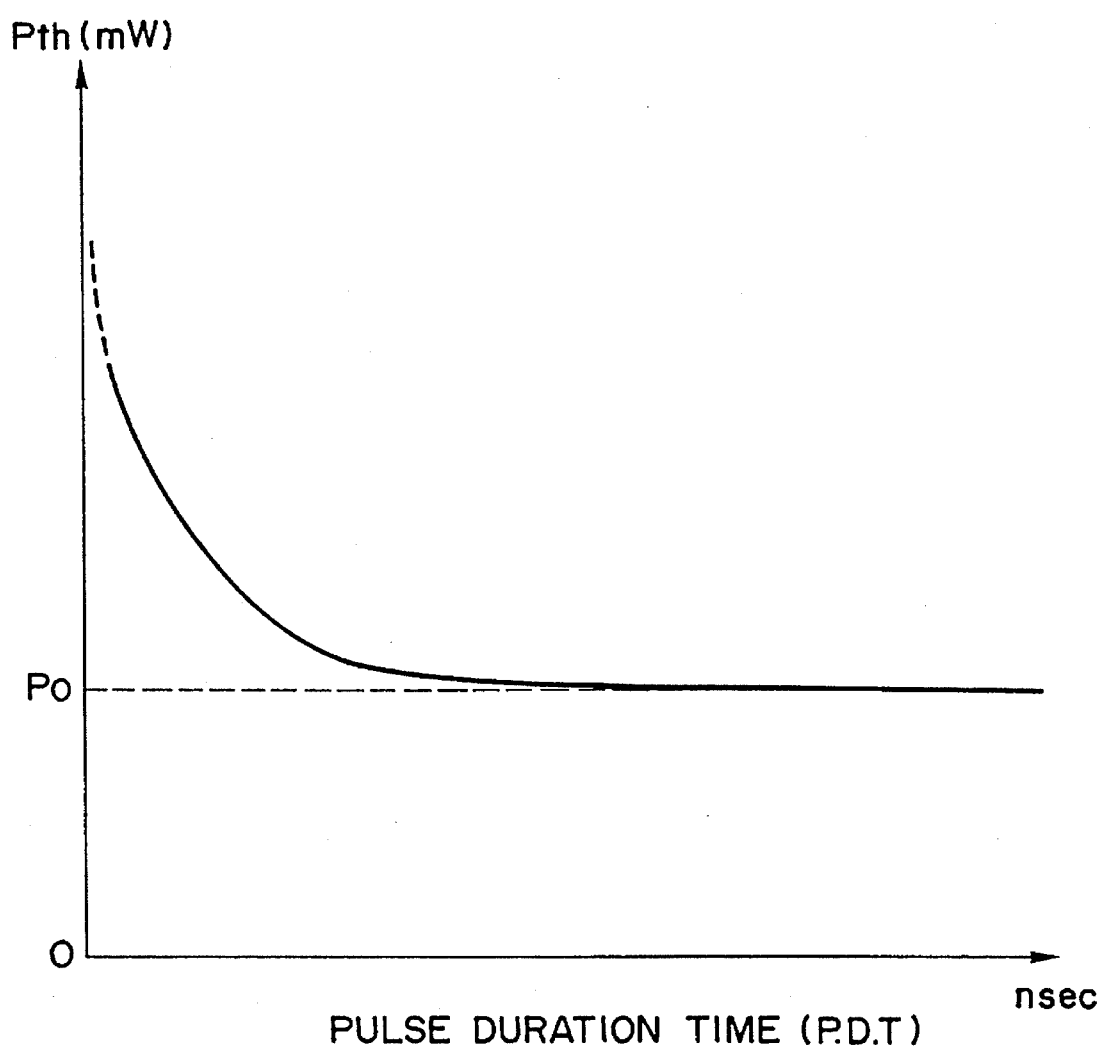
FIG. 6 is a graph wherein data are plotted while the ordinate represents $P_{th}$, and the abscissa represents P.D.T.
Figure 7:
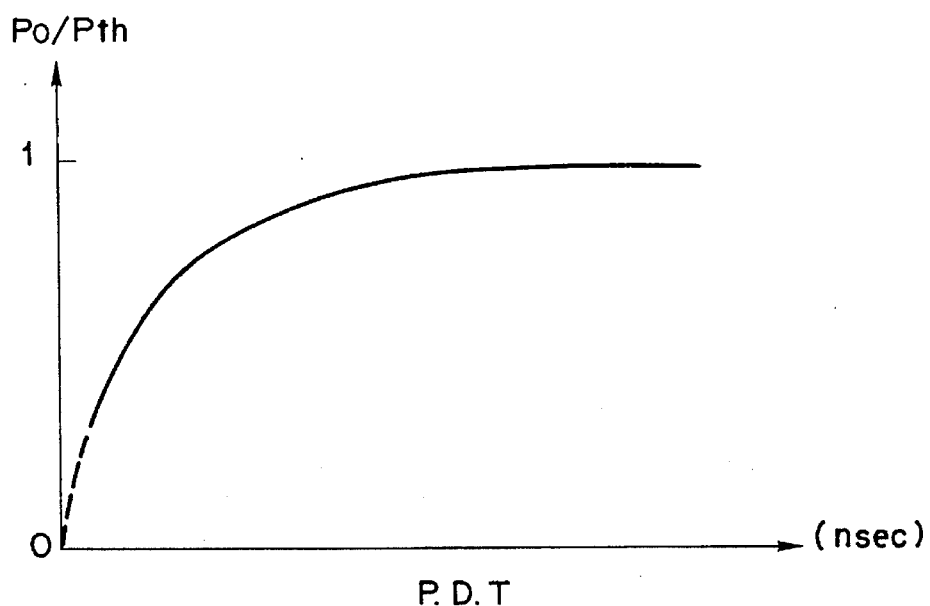
FIG. 7 is a graph wherein data are plotted while the ordinate represents $P_0/P_{th}$, and the abscissa represents P.D.T. (showing the elevated temperature profile of the disk)
Figure 8:
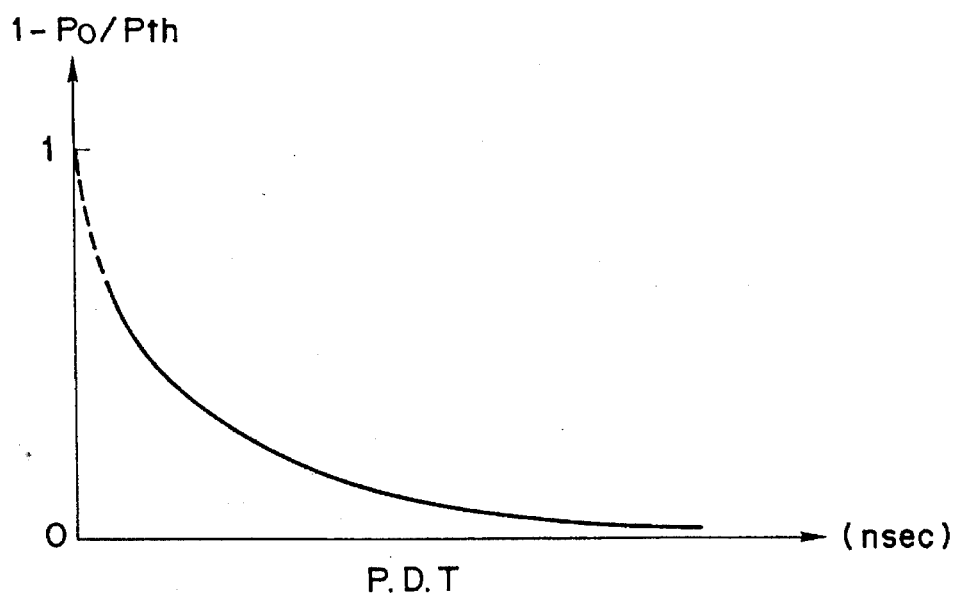
FIG. 8 is a graph wherein data are plotted while the ordinate represents $1-P_0/P_{th}$, and the abscissa represents P.D.T. (showing the decreased temperature profile of the disk)
Figure 9:
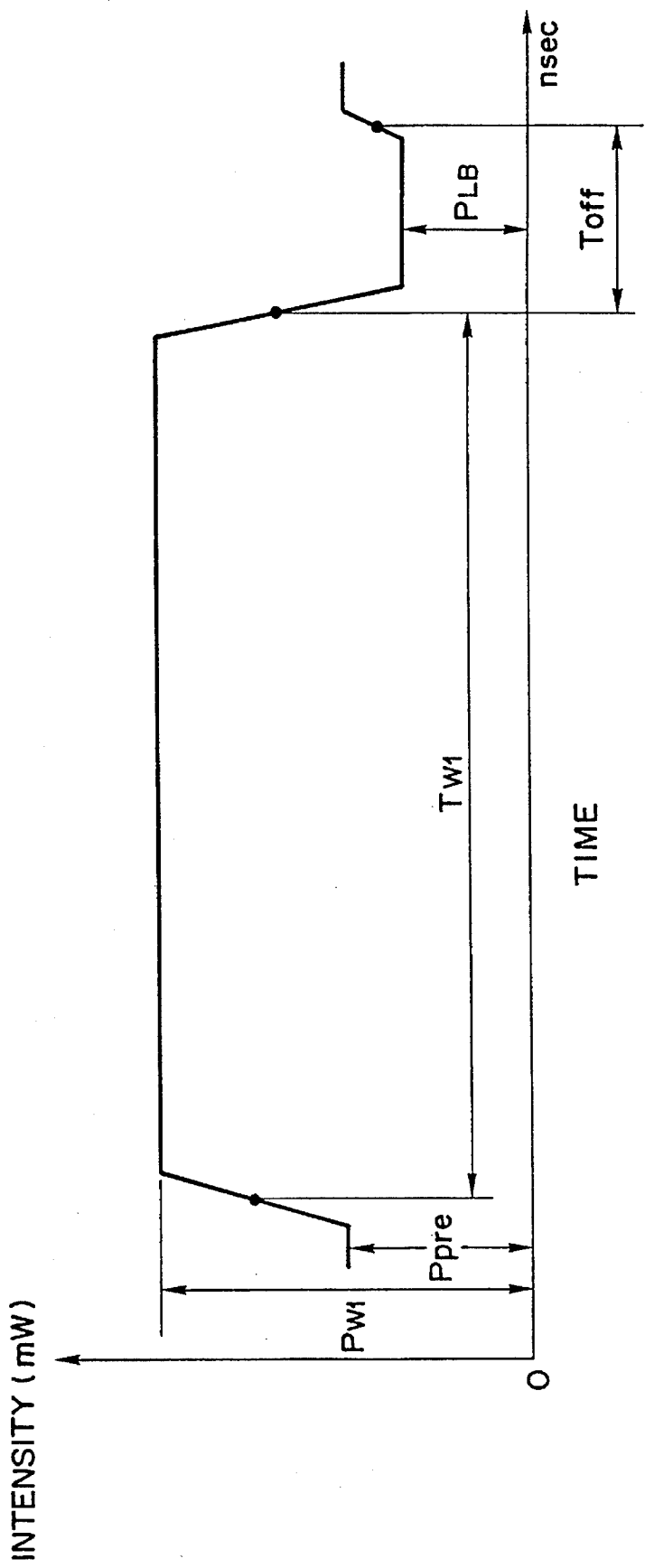
FIG. 9 is a waveform chart of a laser beam intensity when one mark is formed using a heat shut off method.
Figure 10:
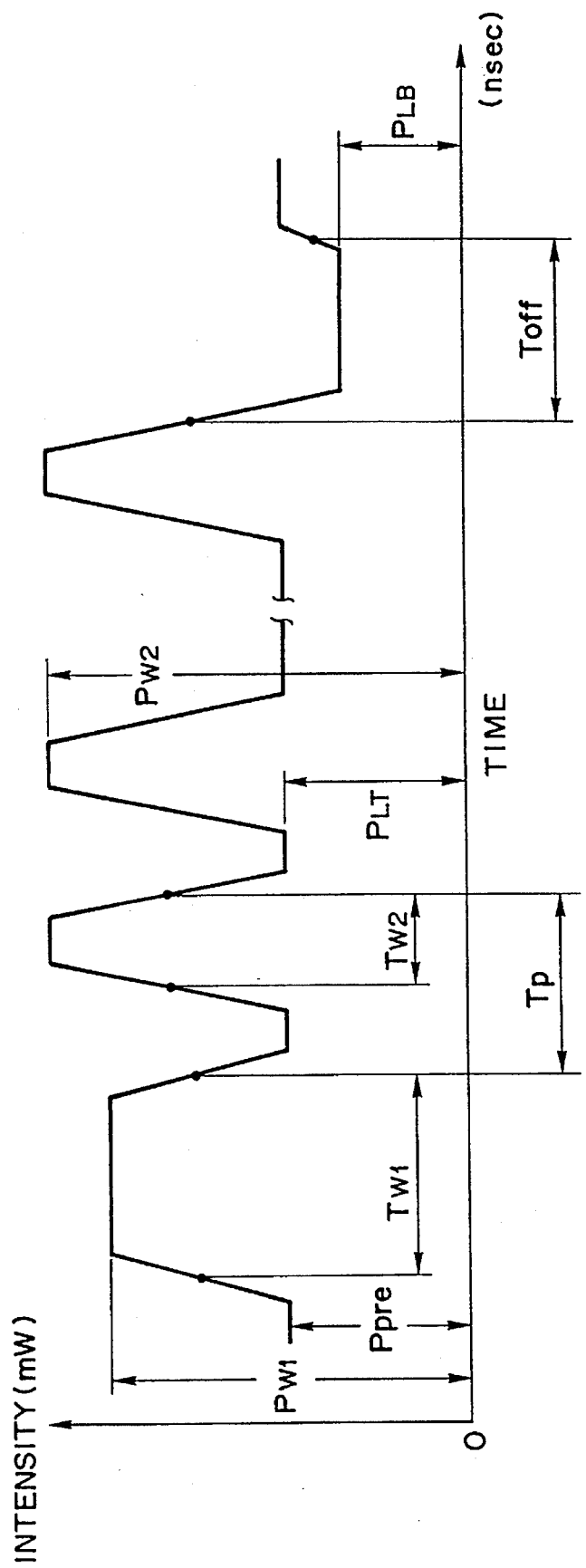
FIG. 10 is a waveform chart of a laser beam intensity when one mark is formed using the heat shut off method and a pulse train method.
Figure 11:
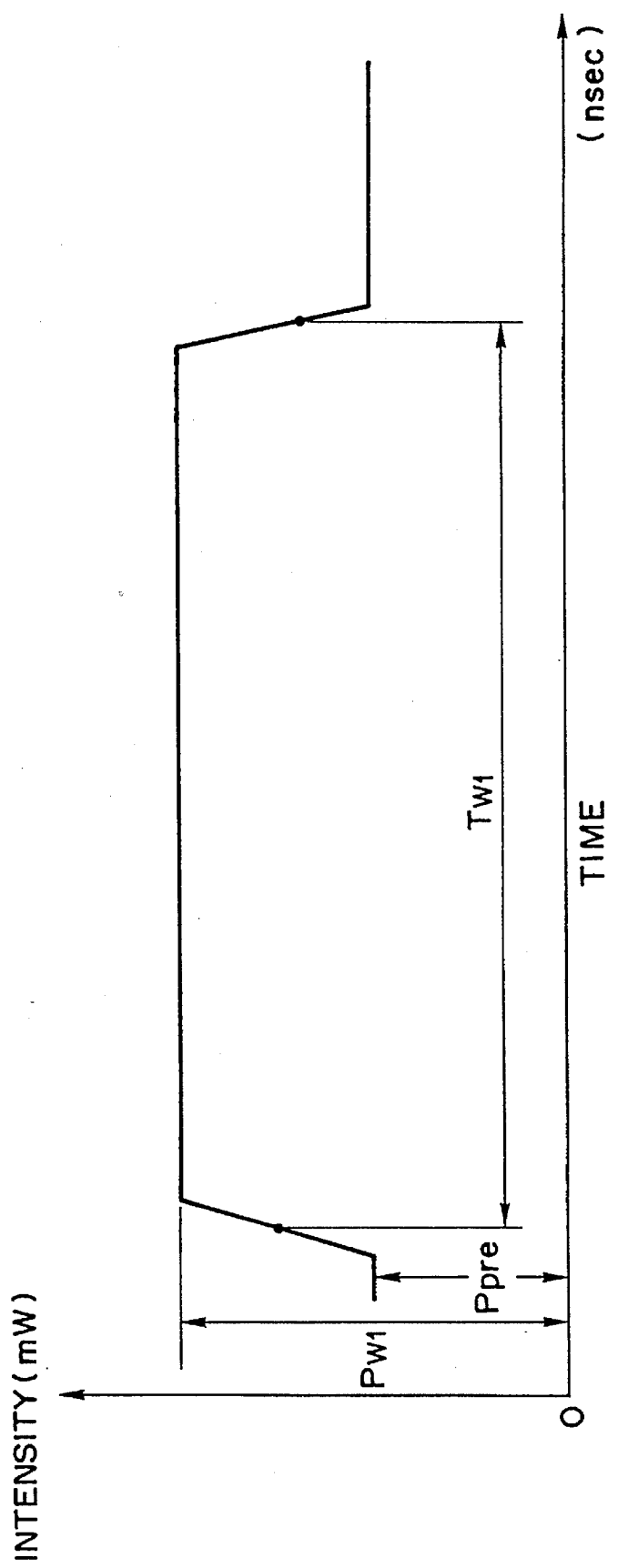
FIG. 11 is a waveform chart of a laser beam intensity when one mark is formed by a conventional method.
Figure 12:
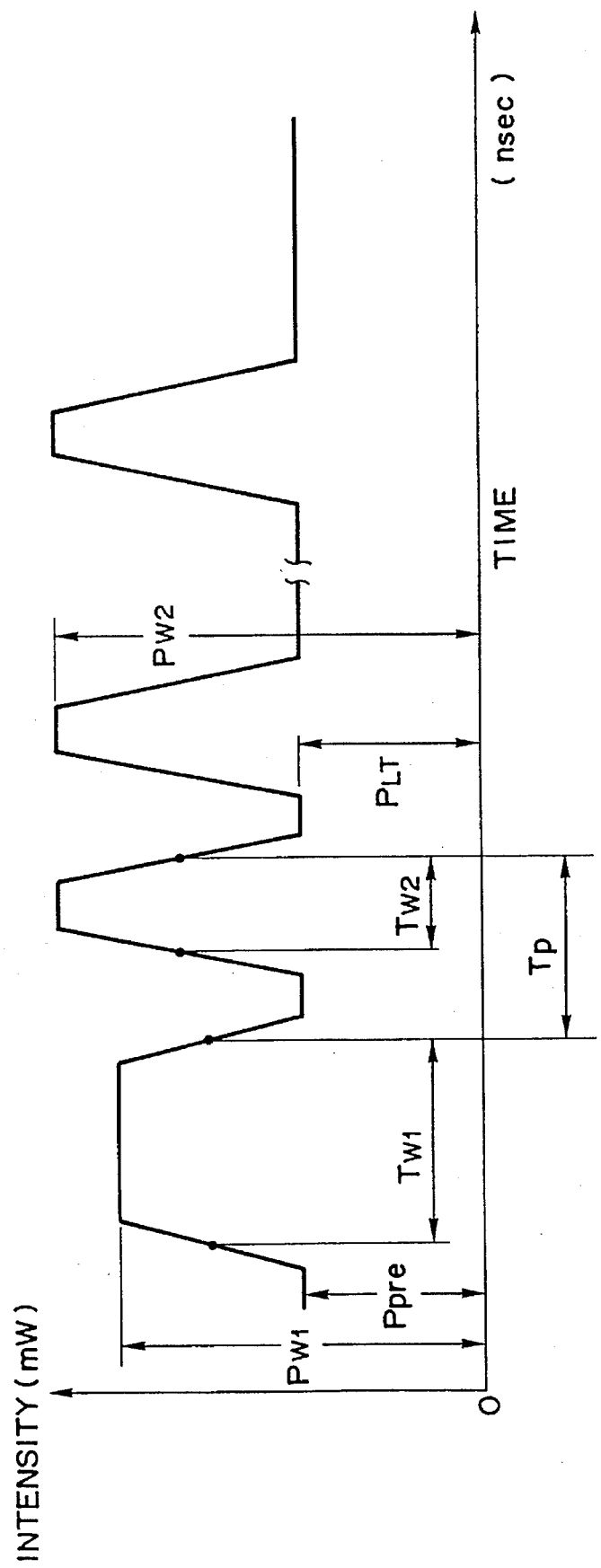
FIG. 12 is a waveform chart of a laser beam intensity when one mark is formed by the pulse train method.
Figure 13:
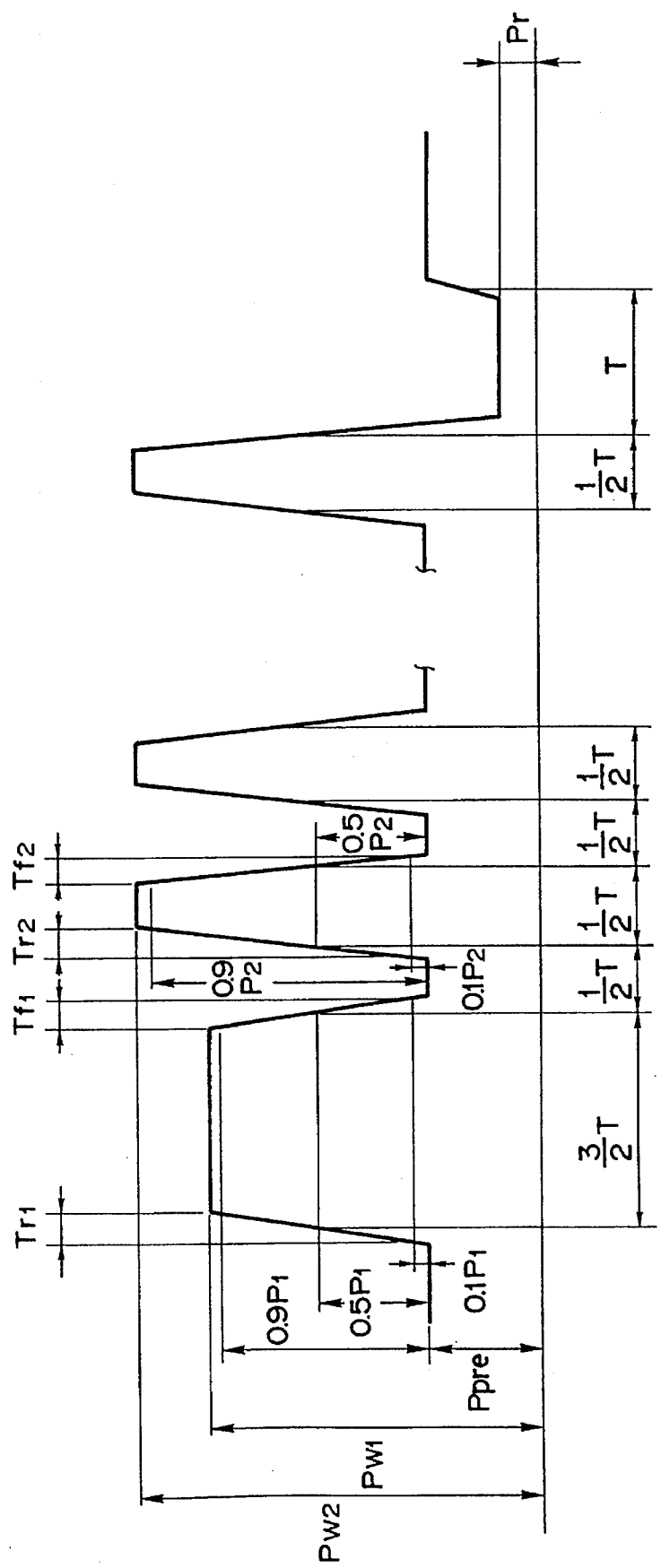
FIG. 13 is a waveform chart described in STANDARD ECMA/TC31/92/36 3rd Draft Proposal, p. 87.
Figure 14:
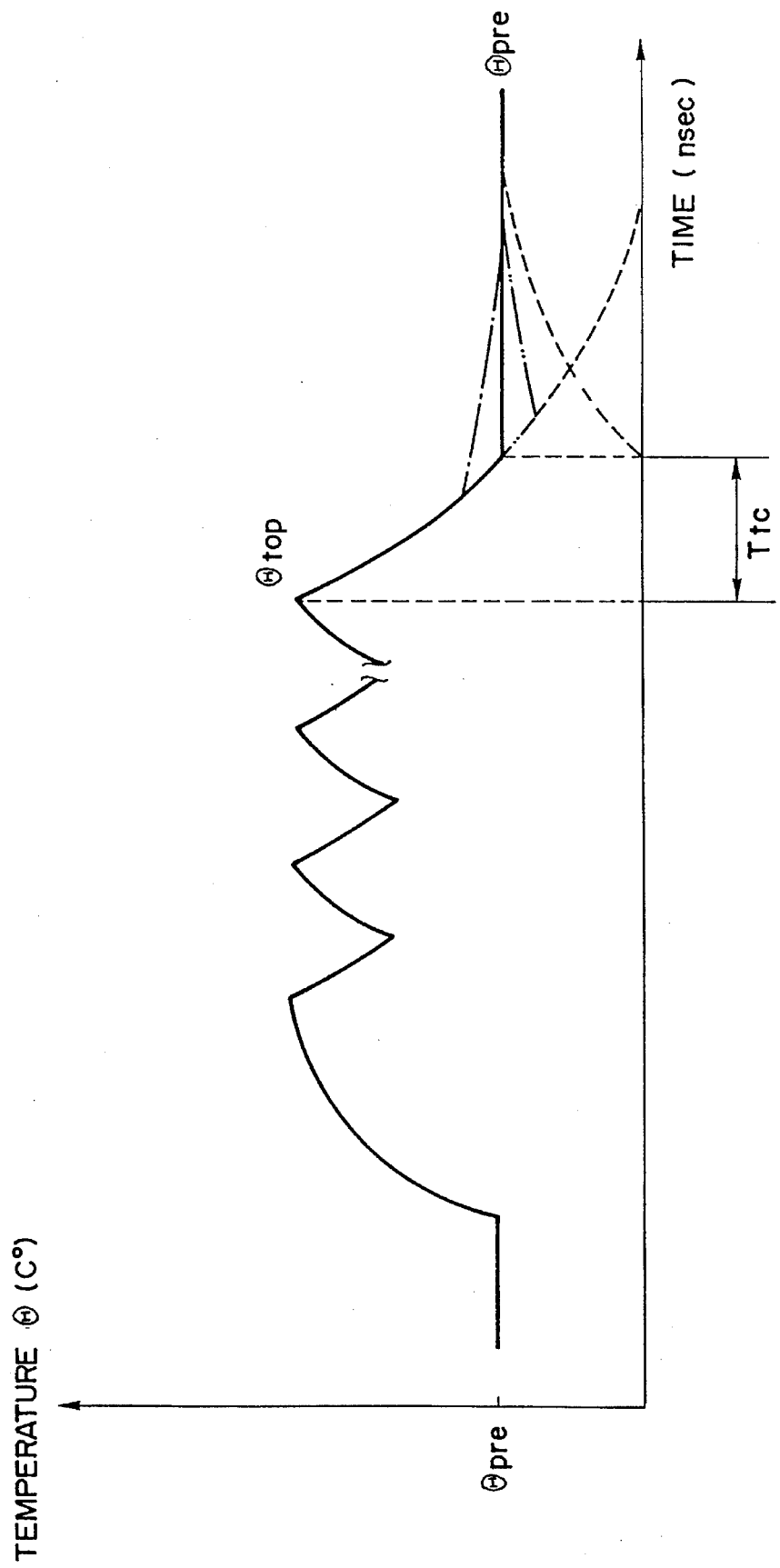
FIG. 14 is a graph of a change in temperature at the spot center of the laser beam or a change in peak temperature as time elapses when a mark is formed by the pulse train method and the heat shut off method.

In the above-mentioned apparatus, a magnetooptical disk having τ=36 nsec (V=11.3 m/sec) measured by the above-mentioned measurement method of τ was prepared. After the entire surface of the disk was initialized, the magnetooptical disk was rotated at a measurement linear velocity V=11.3 m/sec, and an NRZI mark length recording random signal of ⅔ one seven R.L.L., 0.56 μm/bit, T (write clock period)=33 nsec was recorded on the disk using a recording/reproduction laser beam, which had N.A.=0.55, a wavelength=830 nm, and laser pulse rising and falling times of about 5 nsec under the following conditions. As a pulse waveform, the pulse train method and the heat shut off method, as shown in FIG. 2, were adopted. The number of types of marks was 7, i.e., 2T to 8T marks. FIG. 2 is a waveform chart of the laser beam intensity when 2T to 8T marks are formed. An nT mark is a mark with which the width of a reproduction pulse becomes n times (e.g., twice for the 2T mark) of the clock period T when the recorded mark is reproduced.

The heat shut off conditions were $P_{W1}$=11.5 mW, $T_{W1}$=50 nsec (=T×½), $P_{LB}$=$P_r$=1.5 mW, $P_{pre}$=3.5 mW, and $T_{off}$=50 nsec (a value for minimizing recording data pattern dependency of the mark formation start position, i.e., the mark leading edge position).

EXAMPLE 1

$T_p$, $T_{W2}$, and $P_{W2}$ were respectively fixed to $T_p$=33 nsec (=T), $T_{W2}$=16.5 nsec (=T×½), and $P_{W2}$=$P_{W1}$=11.5 mW.

Thereafter, recording was performed while variously changing $P_{LT}$, recorded data were reproduced at a reproduction laser beam intensity $P_r$=1.5 mW, and "recording data pattern dependency of the mark trailing edge position" was measured. As a result, the dependency was minimum when $P_{LT}$=4.6 mW.

EXAMPLE 2

$T_p$, $P_{LT}$, and $P_{W2}$ were respectively fixed to $T_p$=33 nsec (=T), $P_{LT}$=$P_{pre}$=3.5 mW, and $P_{W2}$=$P_{W1}$=11.5 mW.

Thereafter, recording was performed while variously changing $T_{W1}$, recorded data were reproduced at a reproduction laser beam intensity $P_r$=1.5 mW, and "recording data pattern dependency of the mark trailing edge position" was measured. As a result, the dependency was minimum when $T_{W2}$=21.5 nsec.

EXAMPLE 3

$T_p$ and $T_{W2}$ were respectively fixed to $T_p$=33 nsec (=T), and $T_{W2}$=16.5 nsec (=T×½), and $P_{LT}$=5.0 mW was set.

At this time, $P_{W2}$ calculated from formula (1) was $P_{W2}$=10.8 mW. Recording was performed under this condition, recorded data were reproduced at a reproduction laser beam intensity $P_r$=1.5 mW, and "recording data pattern dependency of the mark trailing edge position" was measured. As a result, the dependency was small, and identifiability of data was good. Also, recording and reproduction were attempted while variously changing only $P_{W2}$. In this case, when $P_{W2}$=10.8 mW, the dependency was minimum. The value $P_{W2}$ was lower by 2.5 mW than that of Comparative Example to be described later.

EXAMPLE 4

$T_p$ and $P_{LT}$ were respectively fixed to $T_p$=33 nsec (=T), and $P_{LT}$=$P_{pre}$=3.5 mW, and $T_{W2}$=25.0 nsec (=T×¾) was set.

At this time, $P_{W2}$ was calculated to be $P_{W2}$=10.7 mW by formula (1). Recording was performed under this condition, recorded data were reproduced at a reproduction laser beam intensity $P_r$=1.5 mW, and "recording data pattern dependency of the mark trailing edge position" was measured. As a result, the dependency was small, and identifiability of data was good. Also, recording and reproduction were attempted while variously changing only $P_{W2}$. In this case, when $P_{W2}$=10.7 mW, the dependency was minimum. The value $P_{W2}$ was lower by 2.6 mW than that of Comparative Example to be described below.

COMPARATIVE EXAMPLE $T_p$, $P_{LT}$, and $T_{W2}$ were respectively fixed to $T_p$=33 nsec (=T), $P_{LT}=P_{pre}$=3.5 mW, and $T_{W2}$ =16.5 nsec (=T× ½).

Thereafter, recording was performed while variously changing $P_{W2}$, recorded data were reproduced at a reproduction laser beam intensity $P_r$=1.5 mW, and "recording data pattern dependency of the mark trailing edge position" was measured. As a result, the dependency was minimum when $P_{W2}$=13.3 mW. This value was higher by 2.5 mW than that in [Example 3], and by 2.6 mW than that in [Example 4].

As described above, according to the present invention, since an optimal pulse train condition for an optical disk can be determined, when optical recording is performed using this condition, "data pattern dependency of the mark formation end position, i.e., the mark trailing edge position" can be minimized all the time for any optical disk, and the value $P_{W2}$ for minimizing the dependency can be decreased. As a result, high-density recording can always be achieved, and a decrease in identifiability of data can always be prevented.

What is claimed is:

1. In an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, and thereafter, the laser beam is intensity-modulated between $P_{LT}$ and an intensity $P_{W2}$ higher than $P_{LT}$, $P_{W2}$ being maintained for a time $T_{W2}$, so as to form a mark on said optical recording medium, the improvement characterized in that by controlling at least one of $P_{W2}$, $P_{LT}$, and $T_{W2}$, a medium temperature, after an elapse of $T_{W1}$, at a peak temperature position or a spot center position of the laser beam radiated onto the medium surface, becomes equal to a medium temperature after an elapse of $T_{W2}$.

2. An optical recording apparatus comprising:

means for radiating a laser beam onto an optical recording medium;

moving means for changing a radiation position of the laser beam on said recording medium;

modulation means for raising an intensity of the laser beam to be radiated onto said optical recording medium from an intensity $P_{pre}$ for maintaining a pre-heat state, in which a temperature of the medium surface becomes a predetermined temperature, to an intensity $P_{W1}$ higher than $P_{pre}$, reducing the intensity to an intensity $P_{LT}$ lower than $P_{W1}$ after $P_{W1}$ is maintained for a time $T_{W1}$, and thereafter, intensity-modulating the laser beam between $P_{LT}$ and an intensity $P_{W2}$ higher than $P_{LT}$, $P_{W2}$ being maintained for a time $T_{W2}$, so as to form a mark; and control means for controlling at least one of $P_{W2}$, $P_{LT}$, and $T_{W2}$, so that a medium temperature, after an elapse of $T_{W1}$, at a peak temperature position or a spot center position of the laser beam radiated onto the medium surface, becomes equal to a medium temperature after an elapse of the time $T_{W2}$.

3. A method for determining a pulse train condition in optical recording in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, and thereafter, the laser beam is intensity-modulated between $P_{LT}$ and an intensity $P_{W2}$ higher than $P_{LT}$, $P_{W2}$ being maintained for a time $T_{W2}$, so as to form a mark on said optical recording medium, comprising the step of:

determining a combination of $P_{W2}$, $P_{LT}$, and $T_{W2}$, so that a medium temperature, after an elapse of $T_{W1}$, at a peak temperature position or a spot center position of the laser beam radiated onto the medium surface, becomes equal to a medium temperature after an elapse of $T_{W2}$.

4. An apparatus for determining a pulse train condition in optical recording in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{LT}$ lower than $P_{W1}$, and thereafter, the laser beam is intensity-modulated between $P_{LT}$ and an intensity $P_{W2}$ higher than $P_{LT}$, $P_{W2}$ being maintained for a time $T_{W2}$, so as to form a mark on said optical recording medium, comprising:

a calculation unit for calculating a combination of $P_{W2}$, $P_{LT}$, and $T_{W2}$, so that a medium temperature, after an elapse of $T_{W1}$, at a peak temperature position or a spot center position of the laser beam radiated onto the medium surface, becomes equal to a medium temperature after an elapse of $T_{W2}$; and an output unit for outputting values calculated by said calculation unit.

* * * * *